United States Patent Office 3,441,365
Patented Apr. 29, 1969

3,441,365
PROCESS AND COMPOSITIONS FOR TREATING LEATHER AND LEATHERS OBTAINED
John A. Lowell, Philadelphia, and Peter R. Buechler, Langhorne, Pa., assignors to Rohm & Haas Company, Philadelphia, Pa., a corporation of Delaware
No Drawing. Filed Dec. 23, 1965, Ser. No. 516,113
Int. Cl. C14c 9/00, 3/22
U.S. Cl. 8—94.21                                                    5 Claims

ABSTRACT OF THE DISCLOSURE

In accordance with the present invention it has been found that leathers can be improved in break and resistance to scuffing and can be greatly improved in flexibility and in ease of extension so that they are not subject to grain-cracking even in such severe flexing and extending operations as the bending thereof over a last in forming the upper of a shoe by impregnation of the leather with a composition comprising an organic solvent solution containing (1) the reaction product of a polyisocyanate or of a polyisothiocyanate with a polymeric compound, having an average molecular weight of about 400 to about 10,000 and two or more groups containing a reactive hydrogen atom selected from the group consisting of hydroxyl, thiol (SH), carboxyl, amino, and amido (—CONH— or —CONH$_2$) groups, said compound being selected from the group consisting of polyethers, polyesters, polyamines, polyaminoethers, polyesters, polyether esters, polyamides, polyether amides and polyester amides and (2) certain acrylic copolymers as defined hereinafter containing about 3.5 to about 25 mole percent of units containing a group having a reactive hydrogen atom selected from the group consisting of hydroxyl, thiol, carboxyl, amino and amido groups. The reaction product (1) used in making up the impregnating composition preferably contains unreacted isocyanate or isothiocyanate groups, e.g. about 0.2% to 8%, and preferably about 1 to 5%, by weight thereof in the reaction product. The amount of copolymer (2) may be from 5% to 95% by weight of the total weight of reaction product (1) and (2).

---

This invention is concerned with impregnated leathers and the improvement of leather by a treatment which involves an impregnation thereof with certain materials for the purpose of preparing it for finishing. It is particularly concerned with a treatment which provides leathers having improved break, fuller substance, and improved resistance to abrasion and scuffing.

It is already known (see, for example, U.S. Patents 2,126,321 and 2,763,577) to impregnate leathers with organic solvent solutions of certain polymeric substances and plasticizers therefor. The products obtained by such treatments tend to change with time as plasticizer migration into the leather is gradually lost. When aqueous systems (U.S. Patent 3,103,447) are employed with vegetable-tanned leathers, especially case and upholstery leathers where large amounts of uncombined tannins are present, the penetration is hindered by the swelling and consequent pore-blocking caused by the aqueous systems.

U.S. Patent 2,884,340 discloses various ways of finishing leather including a procedure involving a preliminary application to the grain side of a tanned but unifinished leather (i.e. in the so-called "crust" state) of either (1) an organic solvent solution comprising a mixture of a vinyl polymer, a condensation polymer (e.g. a polyester, a polyamide or a polyester amide), and a polyisocyanate (Example 1 of the patent) or (2) an organic solvent solution of a vinyl polymer, and the reaction product of a polyisocyanate and a condensation polymer (Example 12 of the patent).

U.S. Patent 3,066,997 discloses the preliminary impregnation of a tanned leather in the crust condition with a reaction product of a polyisocyanate or a polyisothiocyanate with a polyfunctional alcohol, amine, or aminoalcohol or an organic solvent solution of such a reaction product. While this treatment improves the break and resistance to scuffing and the leathers produced therefrom have a reasonable degree of flexibility, it has been found difficult to use the leathers in certain situations where a high degree of flexibility is required, as in the making of the uppers of shoes, because of their tendency to develop grain cracks either during the making of the article such as the shoe or even during brief periods of normal use or wearing of the articles.

U.S. Letters Patent 3,231,420 discloses the treatment of leather in the crust state with an organic solvent solution of certain acrylic copolymers. The present invention, however, provides much greater break improvement and leathers having better temper and more resiliency.

In accordance with the present invention it has been found that leathers can be improved in break and resistance to scuffing and can be greatly improved in flexibility and in ease of extension so that they are not subject to grain-cracking even in such severe flexing and extending operations as the bending thereof over a last in forming the upper of a shoe by impregnation of the leather with a composition comprising an organic solvent solution containing (1) the reaction product of a polyisocyanate or of a polyisothiocyanate with a polymeric compound, having an average molecular weight of about 400 to about 10,000 and two or more groups containing a reactive hydrogen atom selected from the group consisting of hydroxyl, thiol (SH), carboxyl, amino, and amido (—CONH— or —CONH$_2$) groups, said compound being selected from the group consisting of polyethers, polyesters, polyamines, polyaminoethers, polyesters, polyether esters, polyamides, polyether amides and polyester amides and (2) certain acrylic copolymers as defined hereinafter containing about 3.5 to about 25 mole percent of units containing a group having a reactive hydrogen atom selected from the group consisting of hydroxyl, thiol, carboxyl, amino and amido groups. The reaction product (1) used in making up the impregnating composition preferably contains unreacted isocyanate or isothiocyanate groups, e.g. about 0.2% to 8%, and preferably about 1 to 5%, by weight thereof in the reaction product. The amount of copolymer (2) may be from 5% to 95% by weight of the total weight of reaction product (1) and (2). In preferred embodiments, these two components are used in such proportions that there are from 0.6 to 1.6 moles of the component (1) per mole of the reactive-hydrogen containing copolymer (2). For some purposes a 1 to 1 ratio between such components may be most suitable. On drying, preferably at temperatures above room temperature, the components (1) and (2) react with each other and, it is believed, also with the collagen or other reactive portions of the leather to form a high molecular weight, network copolymer. This network or three-dimensioned copolymer is surprisingly flexible and greatly extensible at much lower stress/strain ratios than obtained for the usual polyurethane rubbers (which contain short cross-links) without loss of rapid elastic response, and apparently accounts for the outstanding resistance to grain-cracking obtainable in conjunction with the improved break and resistance to scuffing by application of the compositions of the present invention.

In accordance with the present invention, the leather is impregnated from the grain side with the composition of the present invention. Depending on the effect desired, the depth of penetration of the composition into the leather may be varied by selection of higher or lower molecular weight components (1) and/or (2), by varying the concentration of solute and thereby the viscosity of the composition, and by including other components, such as one or more water-repellents, lubricants, plasticizers, and/or thickeners. The amount of the composition applied per unit of area of the leather before substantial drying thereof also serves to control the depth of penetration. Some of the composition may, if desired be allowed to remain as a coating deposit on the surface of the leather. For some purposes, it may be useful to apply the composition of the invention to both sides of the leather so as to penetrate from each side to a depth of at least 15% of the thickness of the leather, and in some few cases even up to the entire thickness thereof.

In general, however, the composition should be applied so that it penetrates to a depth of at least half the thickness of the corium minor up to approximately one third of the total leather thickness. Preferably, the entire corium minor is penetrated and a substantial amount of polymer is deposited within the corium minor and at the junction of the corium minor and the corium major but without extensive penetration of, or deposition in, the corium major. In other words, the preferred treatment of the present invention involves substantially complete penetration of the corium minor and involves considerable permeation or penetration of the polymer through all of the areas of the corium minor and not merely the filling of the hair follicles and openings to the sebaceous glands.

The copolymers of component (2) are water-insoluble copolymers, of a mixture of monoethylenically unsaturated molecules comprising (a) about 3.5 to 25 mole percent, and preferably 6 to 12.5 mole percent, of at least one monomer containing a group having a reactive hydrogen as stated hereinbefore, (b) 1.5 to 8 mole percent, preferably 1.5 to 5 mole percent, of at least one ester of acrylic acid or methacrylic acid with a saturated monohydric aliphatic alcohol having 8 to 18 carbon atoms, (c) from 10.5 to 43 mole percent, preferably 16 to 27 mole percent of methyl, ethyl, or isobutyl methacrylate, and (d) about 32 to 84.5 mole percent, preferably 58.5 to 80 mole percent, of an ester of acrylic acid with a saturated monohydric alcohol having 1 to 4 carbon atoms, with the additional provisos that the total of (a) and (c) should be from 15 to 45 mole percent and that the mole ratio of (b) to (c) should be from 1:3.3 to 1:6.7.

Examples of the reactive hydrogen-containing monomers include $\alpha,\beta$-monoethylenically unsaturated acids, such as acrylic, methacrylic, and itaconic acids; hydroxyalkyl($C_1$–$C_4$) vinyl ethers and sulfides; hydroxyalkyl ($C_1$–$C_4$) acrylates or methacrylates; N-hydroxyalkyl ($C_1$–$C_4$)-acrylamides or -methacrylamides; the corresponding mercaptoalkyl acrylates, methacrylates, -amides, and -methacrylamides; acrylamide, methacrylamide, their N-methylol, N-($C_1$–$C_4$)-alkyl, and N-($C_1$–$C_4$)alkoxymethyl derivatives; alkenylimidazoles and imidazolines, e.g. 2-(3-butenyl) - 2 - imidazoline; aminoalkyl($C_1$–$C_4$) acrylates and methacrylates, N-($C_1$–$C_4$)alkylaminoalkyl ($C_1$–$C_4$) acrylates and methacrylates; N-(aminoalkyl ($C_1$–$C_4$))-acrylamides and -methacrylamides; aminoalkyl ($C_1$–$C_4$) vinyl ethers and sulfides; and N,N'-ethyleneureido-($C_1$–$C_4$)alkyl acrylates, methacrylates, vinyl ethers and sulfides.

Preferred copolymers are those of monoethylenically unsaturated molecules comprising (a) about 3.5 to 25.0 mole percent, and preferably 6 to 12.5 mole percent, of acrylic acid, methacrylic acid, or itaconic acid, (b) 1.5 to 8 mole percent, preferably 1.5 to 5 mole percent, of at least one ester of acrylic acid or methacrylic acid with a saturated monohydric aliphatic alcohol having 8 to 18 carbon atoms, (c) from 10.5 to 43 mole percent, preferably 16 to 27 mole percent of methyl, ethyl, or isobutyl methacrylate, and (d) about 32 to 84.5 mole percent, preferably 58.5 to 80 mole percent, of an ester of acrylic acid with a saturated monohydric alcohol having 1 to 4 carbon atoms, with the additional provisos that the total of (a) and (c) should be from 15 to 45 mole percent and that the mole ratio of (b) to (c) should be from 1:3.3 to 1:6.7.

A portion of the methyl, ethyl or isobutyl methacrylate may be replaced with acrylonitrile, methacrylonitrile, vinyl acetate, vinyl chloride, vinylidene chloride, styrene, or vinyltoluene or mixtures thereof provided the copolymer contains at least 10.5 mole percent of methyl, ethyl, or isobutyl methacrylate after such replacement; hence the copolymer may contain up to 32.5 mole percent of one or more of the replacement monomers mentioned.

The copolymers used in accordance with the present invention are formed of at least four different monomers as is clear from the definition above. Each is essential as equivalent effects cannot be obtained if one of the four types is omitted. The reactive hydrogen component (a) provides sites in the copolymer having reactivity toward the component (1) which in turn also has a peculiar affinity for the protein component of the leather fibers, favoring retention of the network copolymer (formed from components (1) and (2)) in the leather even when it is soaking wet, as from rain. It also reduces the susceptibility of the network copolymer to migration when a subsequently-applied coating composition in an organic solvent is applied during finishing. The inclusion of component (b), the higher acrylate or methacrylate esters, imparts flexibility and also solubility in non-polar hydrocarbon solvents, and has a distinct advantage as pointed out hereinafter in that it reduces swelling of the leather, and favors penetration. The hardening component (c), represented primarily by methyl methacrylate, is essential to provide the desired "break" improvement. Without this component, little or no improvement in break is obtained. It is also essential that the sum of the acid and hardening components (a) and (c) in the copolymer amount to at least 15 mole percent in order to obtain the desired break improvement. On the other hand, the sum of these two components must not exceed 45 mole percent in the copolymer; otherwise, the impregnated leather shows severe grain cracking and boardiness and feels like a plastic sheet instead of leather. The ratio of components (b) and (c) specified above must also be observed if an improvement in break and resistance to scuffing are to be obtained from the composition of the present invention while retaining the desirable leather properties including the temper, feel, flexibility, fullness, and susceptibility to be manipulated efficiently in manufacturing operations, including adaptability to be die-cut smoothly and evenly without difficulty.

The copolymers may be prepared in any suitable fashion provided they are of proper molecular weight as defined hereinabove. Such copolymers are readily produced by copolymerization in suitable solvents including any of those mentioned hereinafter. The solvent that is to be employed for the impregnation of the leather may be used in the preparation of the copolymer itself so that there is no need to recover the polymer from the initial solution formed and to redissolve such polymer.

To provide good qualities in the impregnated leather, the average molecular weight of the copolymer should be at least 10,000 but should not be so high nor should the molecular weight distribution be such that the viscosity of a 40% solution at 25° C. in a solvent system by which it is to be applied exceeds 100 centipoises when measured on a Brookfield Synchro-Lectric viscometer model LVT using a No. 1 spindle at 60 r.p.m.

Examples of the polymeric materials from which component (1) may be derived include the simple polymers of ethylene oxide or of propylene oxide within the molecular weight range specified. Besides such simple polyethers, there may be used:

(1) Castor oil, castor oil modified with ethylene oxide and trihydroxy polyoxypropylenes having three linear chains and three hydroxyl groups with either glycerine, trimethylol propane, or hexane as the nucleus of the molecule; triamine prepared from diethylenetriamine;

(2) Tetrahydroxy compounds such as those prepared by the addition of alkylene oxides, such as propylene or ethylene oxide to diamines such as ethylene diamine;

(3) Hexahydroxy compounds, such as those prepared by reacting ethylene oxide or propylene oxide with sorbitol or sucrose to obtain chains of polyoxypropylene, each chain terminated with a hydroxyl group.

Other examples of polymeric materials from which component (1) may be derived include reaction product of:

I. Glycols (or other polyols) and dibasic acids
II. Amino alcohols and dibasic acids
III. Glycols, diamines and dibasic acids
IV. Glycols, amino alcohols and dibasic acids
V. Amino alcohols, diamines and dibasic acids
VI. Amino acids, glycols and dibasic acids
VII. Amino acids, amino alcohols and dibasic acids
VIII. Amino alcohols, dibasic acids and hydroxycarboxylic acids
IX. Diamines and dibasic acids It is advantageous to use a small excess of the alcoholic-hydroxyl-containing constituent in preparing the polymers.

Examples of polyols include trimethylol methane and erythritol. Examples of glycols are ethylene glycol, propylene glycol, diethylene glycol, trimethylene glycol, pentamethylene glycol, hexamethylene glycol, decamethylene glycol, dodecamethylene glycol, 1:12 octadecanediol and pentaglycol.

Examples of dibasic carboxylic acids are malonic, succinnic, glutaric, adipic, β-methyladipic, pimelic, suberic, azelaic, sebacic, undecanedioic, brassylic, isophthalic, hexahydroterephthalic, p-phenylene-diacetic and acetone-dicarboxylic acid.

Any amino alcohol having at least one hydrogen atom attached to the amino nitrogen atom may be employed including aromatic amino alcohols, e.g. p-hydroxymethylbenzylamine, 4 - hydroxymethyl-4-aminomethyldiphenyl and p-aminophenylethyl alcohols; aliphatic amino alcohols, e.g. 5-aminopentanol-1:6-amino-5-methyl-hexanol-1,4(p-aminophenyl)cyclohexanol, hydroxyethoxyethoxyethylamine, and N-(β-aminoethyl)-N(omega-hydroxyhexyl)-aniline.

The preferred amino alcohols are of formula

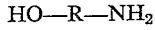

HO—R—NH$_2$ where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

Any diamine may be employed, which contains at least one hydrogen atom attached to each amino nitrogen atom. The preferred diamines are of formula NH$_2$RNH$_2$ where R represents saturated divalent hydrocarbon radicals with a chain length of at least two carbon atoms, e.g., ethylenediamine, hexamethylene diamine, 3-methylhexamethylenediamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula

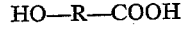

HO—R—COOH where R represents saturated divalent hydrocarbon radicals, e.g., 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

Examples of polyisocyanates and polyisothiocyanates that may be reacted with the polymeric materials to make component (1) include ethylene diisocyanate, trimethylene diisocyanate, tetramethylene diisocyanate, hexamethylene diisocyanate, decamethylene diisocyanate, p-phenylenediisocyanate, m-phenylene diisocyanate, naphthalene diisocyanates, benzene 1:3:5-triisocyanate, toluene-2:4:6-triisocyanate, ethylbenzene-2:4:6-triisocyanate, monochlorobenzene - 2:4:6 - triisocyanate, triphenylmethane-4:4':4''-triisocyanate and diphenyl-2:4:4'-triisocyanate, toluene-2,4-diisocyanate, diphenylmethane-4,4'-diisocyanate 3,3'-dimethyl-4,4'-diisocyanato-biphenyl, 3,3'-dimethoxy-4,4'-diisocyanato-biphenyl, 3,3'-dimethoxy-4,4'-diisocyanato-biphenyl and the corresponding polyisothiocyanates, especially m-phenylene diisothiocyanate and p-phenylene diisocyanate. Mixtures of the polyisocyanates may be used of which a preferred combination is a mixture of toluene-2,4-diisocyanate and either 3,3'-dimethoxy-4,4'-diisocyanato-biphenyl or 3,3'-dimethyl-4,4'-diisocyanato-biphenyl.

The reaction between the polymeric material and the polyisocyanate or polyisothiocyanate may be effected in an inert solvent, such as aliphatic, naphthenic, or aromatic compounds, preferably under an inert atmosphere, such as of nitrogen, at a temperature from room temperature to 130° C. or in some cases as high as 190° C. The reaction may require several hours up to one or two days at room temperature depending on the reactivity of the —NCX—containing compounds (X being O or S). At high temperatures a reaction time as short as 10 minutes may be sufficient. However, it is generally preferred to keep the temperature below 100° C. or even below 60° C. With some slow-acting —NCX—containing compounds, the reaction may be accelerated with a catalyst, such as a tertiary amine. A preferred system involves dissolving the —NCX—containing compound in a solvent and gradually adding the polymeric material so that there is at all times an excess of the former compound, based on the amount of —NCX— groups relative to the reactive hydrogen containing groups of the polymeric material, throughout most or all of the reaction.

The reaction product after cooling may be directly mixed with the copolymer (component (2)) or a solution thereof to provide the proportions of the two components desired. The concentration of the two components in the solution may be in the range of 10 to 60% and is preferably between 20 and 50% inclusive.

The improvement of fullness and feel afforded by the present invention is especially noticeable on the skins of smaller animals, such as sheep, goat and pig, making them suitable for such products as certain types of shoe leathers for which only the skins of larger animals as cowhides, steerhides, and horsehides have heretofore generally been considered suitable. The process of the present invention also has the advantage that it in many cases reduces the need for retannage or completely eliminates such need.

The solvents that may be used include ketones, esters, hydrocarbons and chlorinated hydrocarbons. Examples of ketones include acetone, methyl ethyl ketone, methyl isopropyl ketone, diisobutyl ketone, methyl isobutyl ketone and ethyl isopropyl ketone. Examples of ethers include dioxane, diethyl ether, tetrahydrofuran and diisopropyl ether. Examples of esters include ethyl acetate, isopropyl acetate, butyl acetate, 2-ethoxyethyl acetate, 2-butoxyethyl acetate, ethyl propionate, and methyl butyrate. Examples of hydrocarbons include benzene, toluene, xylenes; petroleum and solvent naphthas of aromatic character and mixtures of these aromatics with aliphatics such as octane and decane. Chlorinated hydrocarbons include methylene chloride, ethylene dichloride, perchloroethylene, chloroform, bromoform, and carbon tetrachloride.

The particular solvent may be composed of a single solvent material or it may be composed of a mixture of any of the materials mentioned hereinabove. Preferred solvents are the hydrophobic types of hydrocarbon or halogenated hydrocarbon type. These solvents have the advantage of not swelling the leather or its components and thereby avoiding the tendency of the solvent-soaked components to swell and block the pores and hinder the penetration of the solution of the polymer. All of the organic solvent systems, whether of hydrophobic character or of the other types mentioned hereinabove, are characterized by substantially less tendency to swell the components of the leather than is generally associated with aqueous media.

The composition of the present invention may also contain additional materials such as dyes, pigments, curing catalysts, lubricants, water-repellents, and other polymeric materials in small proportions. The amount of such additional polymeric substances should be kept relatively low as compared to the total weight of components (1) and (2), and it is preferably not over 25% of the weight of such components. The use of a dye or a pigment is sometimes desirable to reduce the number of subsequent finish coatings when a colored leather is to be produced. The proportion of pigment, however, should not be enough to hinder the entry and penetration of the solution into the leather and thus prevent the complete penetration of the components (1) and (2) thereof through the thickness of the corium minor. In general, the amount of pigment should not exceed 15 parts per 100 parts by weight of the solution used for impregnation.

There may be included 0.1 to 2% by weight, based on the weight of component (1) of a curing catalyst, such as a polyvalent metal salt of a long chain fatty acid having from 6 to 18 carbon atoms such as dibutyltin di(2-ethylhexoate), dibutyltin dilaurate and dibutyltin distearate. There may also be included about 0.25 to 5% by weight, based on the total weight of the impregnating composition, of a water-repellent material such as silicone resin (e.g. any of those of 2,672,455, 2,678,893 and 2,728,736), organometallic complexes (e.g. those of 2,273,040, 2,772,988 and 3,010,780) and such hydrophobic organic compounds as are disclosed in 2,693,996 and 2,824,816.

Non-plasticizing oils may also be included in the impregnating solution. The solvent solution application offers advantages over aqueous impregnation in that the leather fibers are not swollen during application of the impregnating polymer and thus do not form fiber adhesions during the drying process. There is also less area loss due to shrinkage on drying. However, if the leather is to be subsequently wet with water, e.g. by the application of aqueous finishing coats, it is sometimes useful to apply oils which lubricate the leather. These replace the fat liquor which was originally present in the grain surface of the leather and which reduces such "aqueous" adhesions but which can be driven from the grain surface by the application of the solvents in the impregnating mixture.

Natural oils such as neatsfoot, coconut, sperm and cod oils can be employed as leather lubricants. Such oils tend to migrate on later flexing of the leather but can be prevented from doing so by the addition of a long chain solvent-soluble molecule containing a polar group. Examples of the latter are oleic acid, alkenyl succinic acid anhydrides such as octadecenyl, primary tallow amine, ($C_8$-$C_{18}$)-alkylamines, such as tertiary-dodecyl amine, tertiary-pentadecyl amine, and mixtures thereof, and the monoglyceridyl glycolates of natural oils such as neatsfoot monoglyceridyl glycolate. In general 1/10 as much polar constituent as of non-polar natural oil is required to prevent migration of the oil mixture during flexing of the leather. The total concentration of oils in the impregnating mixture is usually 3-7%.

The composition of the present invention may be applied in any fashion provided it is applied under such conditions that time is available for adequate penetration before extensive drying of the solution occurs. In the preferred method, the solution is swabbed, brushed, flow-coated, or sprayed on the grain surface only of the leather. The swabbing, brushing, or wiping action employed may be controlled in duration as the means to assure adequate penetration and deposition to any predetermined depth, and for this purpose, the normal equipment that is used simply for coating leather is ordinarily adequate.

The composition may be applied by drumming or by application to the flesh side, but these expedients in most cases do not provide the most favorable results. In both these cases, deposition of the composition in the flesh side of the leather or throughout its thickness is more or less favored. This may be suitable for some types of leather, such as cordovan, but it cannot provide the outstanding improvement in break desired by the present invention which requires a high concentration of the composition in the corium minor and relatively little or no deposition through the corium major.

More or less of the composition may be left as a coating upon the leather at the end of the impregnation process depending upon the particular manner of effecting the impregnation. However, whether or not a substantial amount of polymer material is left at the surface, it is essential that the composition be forced to penetrate through at least half, and preferably the entire thickness of the corium minor or grain layer. Mere filling of hair pockets with the composition will not suffice. Although it is not essential to follow the impregnation treatment of the present invention with a finishing treatment involving the application of one or more coats of a finishing composition, it is generally preferred to provide such a finishing treatment.

The impregnation may be effected at room temperature or at somewhat elevated temperatures up to 80° C., the higher temperatures being particularly useful when it is desirable to obtain an even lower viscosity with a given concentration of certain of the components (1) and (2).

After deposition of the composition within the body of the leather, the leather is subjected to a drying step. This may be carried out at room temperature or it may be accelerated by heating to somewhat elevated temperatures such as at about 50 to 70° C. On drying, the organic solvent present is volatilized and component (1) reacts with component (2) and probably to some extent with the leather so that there is formed within the body of the leather a highly flexible or three-dimensional copolymer which extends through the pores and interstitial zones between the fibers of the leather.

The invention is, of course, applicable to full-grain leathers, but more particularly it is suited to snuffed or buffed grain leathers and improves the break characteristic of leathers of these types, as well as improving the resistance to scuffing and abrasion. It also renders the subsequently finished leathers more readily repaired if any scuffing penetrates through the finish coats.

The ability of the solution to penetrate the leather depends upon the viscosity and surface tension of the ingredients and their proportions. Viscosity can be lowered by proper selection of the solvent and by increasing the amount of solvent. However, the desirable viscosity in a particular application depends also upon the porosity of the leather in a particular application. This, in turn, is affected by many factors, such as the type of skin, i.e., calf, cowhide, goat, etc., the method of tanning, such as pH, the oil and grease content, previous processes such as liming and bating, the mechanical handling of the skin and the tanning and drying processes, such as setting out and staking, and the amount of buffing.

The depth of penetration is controlled primarily by the amount of solution applied, once the penetrability of the solution has been regulated so as to allow it to penetrate in the first place. The depth of penetration is increased with increasing amounts of solution. Cowhide upper leather will absorb roughly its own weight of liquid. Since a penetration of at least 15% of the thickness of the leather is generally required for best results depending on the proportion of corium minor to corium major, a 15% penetration of cowhide corresponding approximately to application of liquid solution in an amount by weight of 15% of the weight of the leather, and correspondingly for other proportions. Furthermore, a small amount of penetration of less than three to five percent of the thickness of the leather can sometimes be worse than no treatment and can result in a very coarse break which is undesirable.

As between individual skins of a particular type to be treated, particularly sheepskin, the total thickness of the skin will vary and therefore the proportion of thickness of the grain layer to total thickness of the skin may vary considerably. Therefore, an average quantity of solution per unit of area must be determined and used for a particular run. For instance, in a particular run the variation of grain layer thickness to total skin thickness may vary from 20% to 40% and the optimum penetration for the run will then be determined at 30%.

Total thickness impregnation is often undesirable because in addition to the substantially greater cost of materials involved, in total thickness impregnation the natural characteristics of the leather are often impaired. For instance, it is desirable that shoe upper leather be capable of absorbing perspiration vapor and dispersing it to the outside. For this purpose high quality shoe upper leather has absorptive qualities and vapor permeability and these characteristics are inhibited little if any by our process of partial impregnation, whereas total thickness impregnation markedly reduces the moisture absorptive property and vapor permeability of the leather.

The impregnation of the present invention is adapted to be applied to any type of leather such as that obtained from the skins of calves, cattle, goats, sheep, horses, and regardless of the particular manner of tanning. Thus, the leather may be that obtained by chrome tanning, zirconium tanning, vegetable tanning, or tanning by the use of synthetic tanning agents. It is particularly valuable with chromium-tanned leather. At the time of the application of the impregnation, the leather should generally be that obtained after the drying of the tanned, dyed, and/or fat-liquored leather.

The impregnation treatment of the present invention improves the break, the filling, and the resistance to abrasion and scuffing of the leather. The improvement is such that even with tanned leathers of poor quality, impregnated leathers of high quality can be obtained that are suitable for use as shoe uppers, shoe linings, handbags, belts, garments, gloves, luggage, footballs, baseballs, bookbindings, upholstery and other related uses. The improvement in the break referred to is so outstanding that inferior grades of leathers which command a low price because they ordinarily cannot be finished into high quality leather having good break characteristics can be treated by the present invention and converted into high quality leathers having good characteristics as far as break is concerned. In other words, the present invention serves to upgrade leathers, whether the inferiority of the leather treated is that inherent in the particular hide from which the leather was produced or that resulting from the tanning and/or other operations by which it was produced. Because of this capacity of the present invention, it may be applied to the leathers obtained from loose flanks and bellies which are ordinarily of such inferior grade that they have been discarded or used only as so-called "offal" leathers. When applied to such poor grade materials, the finished leathers that can be obtained are so improved in quality that they can be used for the making of shoes, upholstery, bags, belts, briefcases, etc., where high-grade leathers are needed. In addition, sufficient filling action is provided by the composition of the invention to firm the loose areas such as bellies and flanks of the leather so that more of these articles of commerce can be obtained from the leather than would otherwise be possible.

After application of the impregnation, whether or not it involves the leaving of any of the composition on the surface, the leather may be, and preferably is, finished by the application of one or more coatings. This subsequent coating may be any polymeric or other material normally employed for leather finish coatings. It may, of course, be pigmented, dyed, or not, as desired. Conventionally used finishing materials such as nitro-cellulose lacquers or aqueous dispersions or organic solvent solutions of vinyl or acrylic polymers have been found suitable for finishing such impregnated leathers.

In finishing, the surprising discovery was made that the adherence of these leather finishes to such impregnated leather was better than to the surface of the same leather prior to impregnation. In addition, the wet-molding qualities of the finished impregnated leathers are greatly enhanced. This is particularly the case when the leather is plated after application of one or more finish coats.

To assist those skilled in the art to practice the present invention, the following modes of operation are suggested by way of illustration, parts and percentages being by weight unless otherwise specifically noted.

(A) Polyether type urethane prepolymer

To 95.7 g. of a mixture consisting of 80/20 mole ratio of 2,4-toluylene diisocyanate and 2,6-toluylene diisocyanate under constant agitation in a closed flask through which nitrogen gas is being led at a slow rate in order to maintain an inert atmosphere, 500 parts of polypropylene glycol with an average molecular weight of 2000 is added slowly. The mixture is heated to 100±3° C. for 110 minutes and then cooled to room temperature.

To this product is slowly added with continued stirring 71.4 parts of a polymer of the propylene oxide adduct to propylene glycol, such polymer being of an average molecular weight of 1360. Then 30.6 g. of a polymer which is formed by reaction of ethylene oxide with propylene glycol and having an average molecular weight of 1370 is slowly stirred in. The mixture is then reheated to 100°±3° C. for an additional 2¾ hours.

The reaction product is dissolved in a sufficient amount of a chemically dried solvent consisting of 30 parts toluene and 70 parts Solvesso 100 (a high flash aromatic solvent naphtha boiling in the range of 321 to 349° F.) to provide a 30% solids solution.

(B) Polyester type urethane prepolymer

A molten naphthalene-1,5-diisocyanate (220 g.) is agitated in a closed flask through which nitrogen gas at a slow rate is being led to maintain an inert atmosphere. A linear polyester (2000 molecular weight) made from a mixture of adipic acid with a 70/30 molar ratio mixture of ethylene glycol and propylene glycol-1,2 having a hydroxyl number of 56, an acid number of 0.3 and a water content (Karl Fischer titration) of 0.04%, is heat softened at 50–60° C. to render it fluid. Then 1100 grams of the polyester are gradually added to the molten diisocyanate at a very slow rate with continued stirring in order to control the reaction rate. When all the polyester has been added the mixture is then brought to a temperature of 120°±15° C. and maintained there for 160 minutes. The reaction mixture is cooled and dissolved in 3,075 g. of a chemically dried solvent consisting of 30 parts toluene and 70 parts Solvesso 100 to make a final solution which is 30% solids. The free isocyanate content of the polyester prepolymer produced in this fashion is 3.2%.

(C) Polyaminoether type urethane prepolymer

Procedure (A) is repeated except the 30.6 g. of the reaction product (mol. wt. 1370) of ethylene oxide with propylene glycol is replaced with 30 g. of the reaction product of ethylene oxide on monoethanolamine (av. mol. weight about 1600).

(D) Polyamide type urethane prepolymer

To 100 g. of hexamethylene-1,6-diisocyanate under agitation in a closed flask through which nitrogen is slowly passed, there is slowly added 500 parts of a polyamide (av. mol. wt. 2200) of sebacic acid and hexamethylenediamine. The mixture is heated at 85° C. for two hours and cooled to room temperature. The reaction product is dissolved in xylene to provide a 30% solids solution.

(1) 100 parts of the 30% solids solution of the prepolymer of (A) hereinabove is mixed with 100 parts of a 30% solution of a copolymer of about 69.4 mole percent ethyl acrylate, 21.1 mole percent methyl methacrylate, 6.1 mole percent methacrylic acid, and 3.4 mole percent of a ($C_{14}$–$C_{18}$)-alkyl methacrylate (herein designated a cetyl-stearyl methacrylate and derived from a mixed technical alcohol composed essentially of 2% tetradecanol, 30% hexadecanol, and 68% octadecanol) made by the process of Example 1 (a) of U.S. application Ser. No. 208,092 supra except that the solvent (toluene) was replaced by Solvesso No. 150 (a high flash, high aromatic solvent naphtha boiling in the range of 369–406° F.). Before use for impregnating leather, the solution may be diluted to 25% solids by addition of Solvesso 100.

(2) Procedure (1) is repeated execept that the amount of copolymer solution is increased to 200 parts. The mixture is then diluted to 25% total solids with Solvesso 100.

(3) Procedure (1) is repeated except that the urethane prepolymer solution of (A) is replaced with 10 parts of the 30% solids polyamide-urethane prepolymer solution of (D).

(4) Procedure (1) is repeated except that the urethane prepolymer solution of (A) is replaced with 900 parts of the 30% solids polyaminoether-urethane prepolymer solution obtained in (C).

(5) Procedure (1) is repeated except that the urethane prepolymer solution of (A) is replaced with 80 parts of the 30% solids polyester urethane-prepolymer solution of (B).

(6) Procedure (1) is repeated except that the copolymer solution is replaced with a 30% solids solution in xylene of a copolymer of 82 mole percent ethyl acrylate, 10.9 mole percent methyl methacrylate, 3.1 mole percent cetyl-stearyl methacrylate, and 4 mole percent hydroxyethyl methacrylate.

(7) Procedure (1) is repeated except that the copolymer solution is replaced with a 30% solids solution in xylene of a copolymer of 70 mole percent ethyl acrylate, 21.6 mole percent methyl methacrylate, 3.5 mole percent cetyl-stearyl methacrylate and 4.9 mole percent 2(3-butenyl)-2-imidazoline.

(8) (a) The composition of (2) above is applied in selected areas to the buffed grain surface of vegetable retanned chrome steer hide and to the buffed grain surface of chrome tanned steer hide (both leathers being in the crust state) by a flow-coater so that 3–4 grams of polymer solids per square foot are applied to the grain surface. The penetration of the polymer proceeds to a depth one-third of the total leather thickness. This corresponds approximately to the depth of the corium minor-corium major junction.

(b) The impregnated leather obtained in (a) is dried and a conventional plated black pigmented shoe leather finish is applied. The polymeric impregnant is allowed to cure.

(c) The impregnated leathers are compared with correspondingly tanned and similarly finished areas of the same hides which are unimpregnated. The impregnated areas show a significant improvement in both leather break and finish break.

(d) Scuffing across the unimpregnated leathers with the milled edge of a United States coin of fifty cents denomination produces extensive rupture of fibers and break in the base finish. Scuffing similarly attempted on the impregnated leathers does not produce fiber ruptures or breaks in the base finish.

(e) Similar results are obtained when the compositions of (1), (3), (4), (5), (6), and (7) are applied in the same way to such leathers in the crust state.

(9) Three chrome-tanned buffed grain leathers are obtained from commercial sources in a crust state, buffed and ready for finishing.

Mixtures of the urethane polymer solution prepared in (A) above with the acrylic copolymer solution described in (1) above are made to give the following solids proportions.

| Urethane polymer: | Acrylic copolymer |
|---|---|
| 50 | 50 |
| 45 | 55 |
| 35 | 65 |
| 30 | 70 |
| 25 | 75 |

These mixtures are diluted with Solvesso 100 to give 30% total polymer solids.

These mixtures are applied to the buffed grain surface of these leathers by a plush paint roller so that 3–4 grams of polymer solids are deposited per square foot of leather to a depth of one-third the total thickness of the leather which corresponds approximately to the depth of the corium minor-corium major junction. The leathers are dried and finished with a conventional black side leather finish. The impregnants are allowed to age, a process which was accelerated by placing the impregnated leathers in a hot closet for at least one week at 50–60° C. The samples are then removed after one month and kept at 70° F. and relative humidity of 50–55% for three days to regain their normal moisture content.

The grain strength is tested by folding each of the impregnated leathers double against itself with the grain out and exerting pressure on the fold. The impregnated leathers show a significant reduction in the severity of grain crack as compared to leathers impregnated only with the corresponding urethane. These leathers also show an improvement of leather break over comparable non-impregnated leather areas.

(10) A chrome-tanned full grain calfskin in the crust state, ready for finishing is impregnated from the grain surface by a spray application of the impregnation mixture described in (2) above to deposit 2–3 grams of polymer solids to the depth of one-third the total thickness of the leather.

The impregnated full grain calfskin is dried, and finished as a normal leather. After the impregnation is cured, the impregnated leather exhibits a marked improvement in both leather and finish break. When the leather is tested for scuffing as described in (8) (d) above, there is shown a significant improvement in scuff resistance over a calfskin similarly treated but not impregnated.

We claim:

1. A composition for the impregnation of leather comprising a solution in an organic solvent of (1) a reaction product, having 0.2 to 8% by weight of free —NCX groups in which X is oxygen or sulfur, of a polyisocyanate or a polyisothiocyanate with a polymeric compound, having an average molecular weight of about 400 to about 10,000 and at least two groups containing a reactive hydrogen atom selected from hydroxyl, thiol, carboxyl, amino, and amido groups, said polymeric compound being selected from polyethers, polyesters, polyamines, polyaminoethers, polyether esters, polyamides and polyester amides and (2) a copolymer of monoethylenically unsaturated molecules comprising (a) about 3.5 to about 25 mole percent of at least one monomer containing a group having a reactive hydrogen selected from hydroxyl, thiol, carboxyl, amino, and amido, (b) 1.5 to 8 mole percent of at least one ester of acrylic acid or methacrylic acid with a saturated monohydric aliphatic alcohol having 8 to 18 carbon atoms, (c) 10.5 to 43 mole percent of at least one methacrylate selected from methyl, ethyl, and isobutyl methacrylate, and (d) about 32 to 84.5 mole percent of at least one ester of acrylic acid with a saturated monohydric alcohol having 1 to 4 carbon atoms, the total of (a) and (c) being 15 to 45 mole percent and the mole ratio of (b) to (c) being from 1:3.3 to 1:6.7, copolymer having an average molecular weight of at least 10,000 and a viscosity not exceeding 100 centipoises in a 40% solution at 25° C. in the organic solvent in which it is applied, the relative proportions of (1) and (2) being in the weight range of about 5:95 to 95:5.

2. A process for treating leather which comprises impregnating the leather with an organic solvent solution containing at least 10% by weight of a mixture of (1) a reaction product, having 0.2 to 8% by weight of free —NCX groups in which X is oxygen or sulfur, of a polyisocyanate or of a polyisothiocyanate with a polymeric compound, having an average molecular weight of about 400 to about 10,000 and at least two groups containing a reactive hydrogen atom selected from hydroxyl, thiol, carboxyl, amino, and amido groups, said polymeric compound being selected from polyethers, polyesters, polyamines, polyaminoethers, polyether esters, polyamides, and polyester amides and (2) a copolymer of monoethylenically unsaturated molecules comprising (a) about 3.5 to about 25 mole percent of at least one monomer containing a group having a reactive hydrogen selected from hydroxyl, thiol, carboxyl, amino, and amido, (b) 1.5 to 8 mole percent of at least one ester of acrylic acid or methacrylic acid with a saturated monohydric aliphatic alcohol having 8 to 18 carbon atoms, (c) 10.5 to 43 mole percent of at least one methacrylate selected from methyl, ethyl, and isobutyl methacrylate, and (d) about 32 to 84.5 mole percent of at least one ester of acrylic acid with a saturated monohydric alcohol having 1 to 4 carbon atoms, the total of (a) and (c) being 15 to 45 mole percent and the mole ratio of (b) to (c) being from 1:3.3 to 1:6.7, the copolymer having an average molecular weight of at least 10,000 and a viscosity not exceeding 100 centipoises in a 40% solution at 25° C. in the organic solvent in which it is applied, the impregnation being effected to penetrate at least half way through the corium minor up to approximately one-third the total leather thickness, the relative proportions of (1) and (2) being in the weight range of about 5:95 to 95:5.

3. A process as defined in claim 2 in which the impregnation is effected on the grain side only.

4. A process as defined in claim 2 in which the impregnation is effected on the grain side only and is controlled to provide penetration and deposition through substantially the entire thickness of the corium minor.

5. As an article of manufacture, a leather having, distributed through at least half the thickness of the corium minor thereof extending from the grain side up to approximately one-third the total leather thickness, a network copolymer formed in situ by the reaction of the components deposited in the leather by impregnation thereof with a composition comprising a solution in an organic solvent of (1) a reaction product, having 0.2 to 8% by weight of free —NCX groups in which X is oxygen or sulfur, of a polyisocyanate or of a polyisothiocyanate with a polymeric compound, having an average molecular weight of about 400 to about 10,000 and at least two groups containing a reactive hydrogen atom selected from hydroxyl, thiol, carboxyl, amino, and amido groups, the polymeric compound being selected from polyethers, polyesters, polyamines, polyaminoethers, polyether esters, polyamides and polyester amides and (2) a copolymer of monoethylenically unsaturated molecules comprising (a) about 3.5 to about 25 mole percent of at least one monomer containing a group having a reactive hydrogen selected from hydroxyl, thiol, carboxyl, amino, and amido, (b) 1.5 to 8 mole percent of at least one ester of acrylic acid or methacrylic acid with a saturated monohydric aliphatic alcohol having 8 to 18 carbon atoms, (c) 10.5 to 43 mole percent of at least one methacrylate selected from methyl, ethyl, and isobutyl methacrylate and (d) about 32 to 84.5 mole percent of at least one ester of acrylic acid with a saturated monohydric alcohol having 1 to 4 carbon atoms, the total of (a) and (c) being 15 to 45 mole percent and the mole ratio of (b) to (c) being from 1:3.3 to 1:6.7, the copolymer having an average molecular weight of at least 10,000 and a viscosity not exceeding 100 centipoises in a 40% solution at 25° C. in the organic solvent in which it is applied, the relative proportions of (1) and (2) in the impregnating composition having been in the weight range of about 5:95 to 95:5.

References Cited

UNITED STATES PATENTS

| | | | |
|---|---|---|---|
| 3,231,420 | 1/1966 | Lowell et al. | 117—142 |
| 2,884,336 | 4/1959 | Loshaek et al. | 117—142 |

DONALD LEVY, *Primary Examiner.*

U.S. Cl. X.R.

117—142; 260—859, 873, 901